United States Patent Office 3,528,743
Patented Sept. 15, 1970

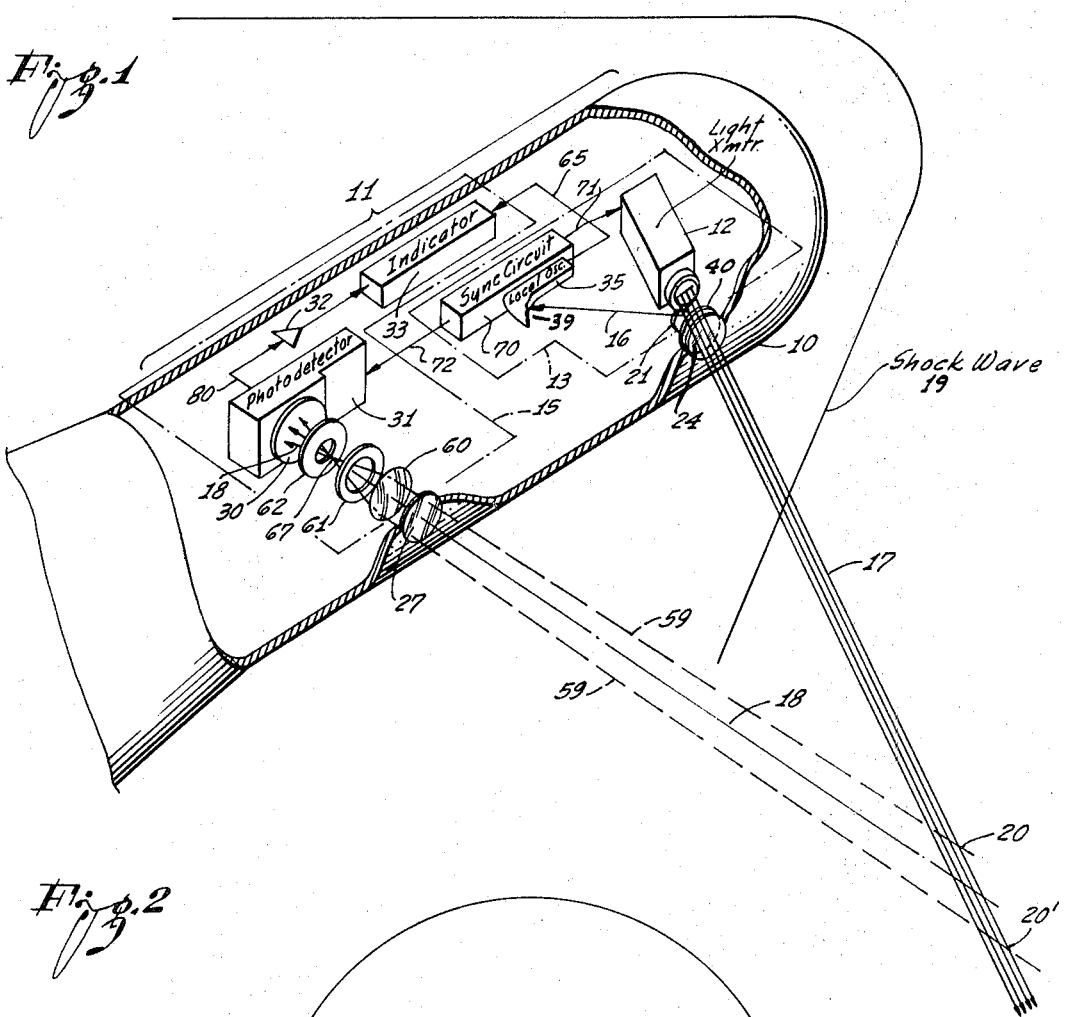
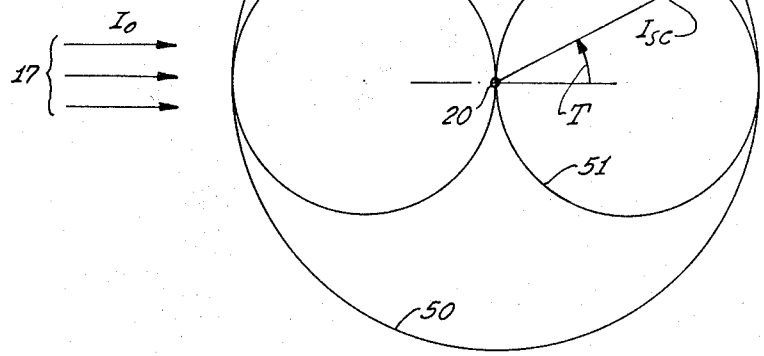

3,528,743
LASER DENSITOMETER
Robert Emmett Scott, Zurich, Switzerland, and Edwin Nathaniel Kaufman, Los Angeles, Calif., assignors to Litton Systems, Inc., Beverly Hills, Calif.
Filed June 29, 1964, Ser. No. 378,625
Int. Cl. G01n 21/00
U.S. Cl. 356—104      1 Claim

ABSTRACT OF THE DISCLOSURE

An apparatus for measuring the density of a medium surrounding a moving vehicle, independent of vehicle orientation or altitude, by detecting the magnitude of light scattered by particles of the medium intercepted by a light beam transmitted from the vehicle. A light-frequency transmitter generates and projects a coherent light signal of a known magnitude that is scattered by the molecules of the medium through which the vehicle is moving. The light scattered by the molecules of the medium is detected by an apparatus within the vehicle at a magnitude off-set from the known magnitude by an amount directly proportional to the density of the surrounding medium. An indicator is provided to establish a reading indicative of the density of the medium surrounding the vehicle.

The present invention relates to apparatus for measuring the density of a medium and, more particularly, to apparatus for determining the density of a medium surrounding a moving vehicle by detecting the magnitude of light scattered by particles of the medium intercepted by a light beam transmitted from the vehicle.

The pilot or controller of a guided vehicle, in order to make decisions regarding the maneuvering of the vehicle within its design capabilities and structural limits, must have knowledge of the characteristics describing the vehicle's movement and attitude. In many instances, the density of the medium through which the vehicle is passing must be known. For example, free-stream density of the atmosphere is one critical air data parameter to be measured for successful and precise re-entry of a space vehicle. Information obtainable from conventional density measuring devices, however, is inherently inaccurate because of the strong shock front surrounding such a vehicle. Moreover, at altitudes greater than 120,000 feet, prior art air density indicators do not operate properly because of the extremely low air density and, at even greater altitudes, because of the concomitant lack of true molecular flow. In the case of electron accelerator type air density indicators, it is obvious that such devices are extremely heavy and present serious problems in adapting them for use in space vehicles.

The present inventors, recognizing these and other disadvantages of the prior art air density indicators, have turned their attention to developing a unique densitometer that accurately measures the density of a medium surrounding a vehicle independent of vehicle orientation or altitude. In accordance with the basic concepts of the invention, their air density indicator employs a light-frequency transmitter (such as laser) which generates and projects from the vehicle a coherent light signal of a known magnitude that is scattered (according to the Rayleigh light scattering principle) by the molecules of the fluid through which the vehicle is moving. The light scattered by the particles of fluid is detected by apparatus within the vehicle at a magnitude offset from the known magnitude by an amount directly proportional to the density of the surrounding medium. This difference in magnitude is, of course, due to the fact that the greater the density of the fluid surrounding the vehicle, the greater the magnitude of light scattering which will occur.

As will be described in detail hereafter, the ability of the present invention to measure air density by employing a light scattering principle is provided by using a high-powered source of monochromatic light, such as the laser, to generate a beam which may be projected beyond the shock front surrounding the vehicle. The molecules of the atmosphere scatter the light in various directions proportional to the density of the gases comprising the atmosphere, the volume of gas intercepted by the light beam, the intensity of the incident light beam, and the ability of the gas molecules to be polarized. If the receiver system within the vehicle is oriented so as to view a known volume of gas intercepted by the light signal and is also responsive to the application of a portion of the incident light signal, a comparison process may be made within the receiver to determine the relationship between the magnitude of back scattered light and the density of the medium into which the incident beam was projected.

It is, therefore, an object of the present invention to accurately measure the free-stream density of the atmosphere of a moving vehicle.

It is another object of the present invention to provide apparatus, having no parts thereof projecting outside the vehicle, for measuring the free-stream density of the atmosphere surrounding the vehicle.

It is yet another object of the present invention to detect the free-stream density of the fluid surrounding the vehicle by measuring the magnitude of light scattered by the medium surrounding the vehicle into which a coherent light-frequency signal has been projected.

It is a further object of the present invention to measure the free-stream density of the atmosphere surrounding a vehicle irrespective of the turbulence created in the atmosphere by the vehicle.

The more important features of the invention have been broadly outlined to facilitate an understanding of the detailed description which follows and to assist in an appreciation of the contribution to the art. There are, of course, additional features of the invention that will be described hereafter and which will also form the subject of the claim appended hereto. Those skilled in the art will appreciate that the conception upon which this disclosure is based may be readily utilized as a basis for designing other structures for carrying out the several purposes of the invention. It is important, therefore, that the claim to be granted herein shall be of sufficient breadth to prevent the appropriation of this invention by those skilled in the art.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

In the drawings:

FIG. 1 is a block diagram of a density measuring system (densitometer) illustrating principles of the present invention; and FIG. 2 is a light intensity diagram illustrating the scattering patterns of light transmitted by a system of the type illustrated in FIG. 1.

With reference now to the drawings, in FIG. 1 is shown a portion of a vehicle 10 employing a density measuring apparatus 11 (constructed in accordance with the principles of the present invention) which measures the density of the fluid surrounding the vehicle 10 by detecting the magnitude of light reflected from particles of the fluid located between a point of incidence 20 and a point of incidence 20'. As shown in FIG. 1, the density measuring apparatus 11 includes a light transmitter 13 employing therein a coherent light source 12 (such as a laser). An incident light beam 17 emitted by the laser 12 is projected through a port 24 in the vehicle 10 into the atmosphere of the vehicle 10 to a region beyond a shock wave 19. A means for focusing the incident light beam 17 at a preselected distance from the light transmitter 12, for example, a focusing lens 40, may be placed between the light transmitter 12 and the port 24. Since it is undesirable to have openings on the outer surface of a fast moving vehicle, the port 24 may be covered with a quartz or sapphire window, either of which is structurally strong and will easily pass the light beam emitted by the laser 12 without derogation.

A number of light rays 18 are illustrated in FIG. 1 as being scattered by molecules of the vehicle's atmosphere between the points 20 and 20' and being radiated back toward the vehicle 10 and through a second port 27 in the side thereof. The scattered rays 18, upon passing through the port 27, enter a light receiver 15. More particularly, behind the port 27 is positioned a lens 60 having a field of view restricted by a pair of appropriately-positioned optical stops 61 and 62; the first stop 61 is positioned between lens 60 and a focal point 67 of the lens, while the second stop 62 is positioned farther away from the lens 60 than its focal point 67. The light receiver 15, in response to the impinged scattered rays 18 and the application of a reference signal 65, detects the difference in magnitude therebetween and converts this difference to an indication of the density of the medium into which the laser beam 17 was projected.

As specifically shown in FIG. 1, the receiver system 15 further includes a light-frequency band-pass filter 30 that passes only a narrow range of wavelengths to substantially reduce background radiation received with the scattered rays 18. Such a band-pass filter is sometimes termed in the art as a multi-dielectric interference filter and often comprises four or more thin dielectric film layers of alternating quarter-wavelength thicknesses of, for example, zinc sulphite (ZnS) and magnesium fluoride (MgF$_2$) applied to a glass substrate. Such a band-pass filter is analogous to filters used in the theory of transmission lines, and is designed to pass a selected bandwidth of frequencies without absorbing much of the incident energy. The spacing of the dielectric layers is carefully adjusted such that the combination passes only light of a given wavelength and reflects all other incident light rays. One light frequency band-pass filter that may be employed in the present invention is the filter number 2420, manufactured by Spectrolab, Inc.

The receiver system 15 still further includes a photo-detector 31 which performs a process of converting the detected scattered rays 18 into an electrical signal. One type of convenient detector available in the art is a photo-multiplier tube (as, for example, RCA 7265) having a pass-band as wide as 300 megacycles. A semiconductor photo-diode, however, seems ot offer high quantum efficiencies and could be an ideal square-law detecting device capable of being used in a detection system of the type employed in the present invention. The photo-multiplier 31 is actuated only during the interval when the laser light beam 17 is emitted. Thus, when the scattered light rays 18 are applied to the photo-cathode of the photo-multiplier tube, a chain reaction of secondary emissions of electrons is set up (based on the photo-electric effect) culminating at the output electrode of the tube. At the output electrode of the photo-multiplier tube is produced an electrical signal 80 proportional to the intensity of scattered rays which are, in turn, proportional to the density of the medium scattering the light beam 17.

The electrical signal 80 generated by the photo-detector 31 is then applied to an amplifier 32, following the photo-detector in the circuit, for amplifying the signal 80 before applying it to an indicator 33.

It will be noticed in FIG. 1 that the indicator 33 is also responsive to a reference signal 65. A beam-splitter 21 is shown intercepting a portion of the incident beam 17 and diverting therefrom a light beam 16 onto a photo-sensitive surface 39 of a local oscillator 35. The local oscillator 35, in turn, converts the light beam 16 into the electrical reference signal 65 proportional to the intensity of the laser beam 17. The local oscillator 35 may comprise, for example, a photo-diode which monitors the output power level of the initial laser pulse and an integrating amplifier that generates a DC output signal proportional to the total output energy of the laser. Accordingly, in the indicator electronics 33 the output signal 80 of the photo-multiplier is divided by the output signal 65 of the local oscillator which results in a high level DC voltage (suitable for meter display or telemetry) that is proportional to the density of the medium between the points 20 and 20'.

A sync control circuit 70 has been included in the transmitter 13 of the embodiment of the invention illustrated in FIG. 1 in order to provide apparatus for conserving the operational life of the photo-detector 31 by applying a control signal 72 (for activating the photo-detector 31) to the photo-detector only when the laser 12 has been actuated by the application of a command signal 71. To accomplish this function, the sync circuit 70 may comprise, for example, logical gating circuits and timing circuits. These circuits cooperate in such a manner that, in response to an inquiry from the pilot of a vehicle 10 or from pre-programmed computer commands, channeled mechanically or electrically, respectively, to the sync circuit 70, the sync circuit 70 generates signals that control the precise moments when the light transmitter 13 and receiver system 15 are activated and the length of time each continues in operation.

Before describing in greater detail the structures and operations of the present density-measuring invention, it is well to briefly review the nature of the scattering phenomenon produced by the incident light beam 17 and the effects of this scattering phenomenon on one's choice of the particular structures used in mechanizing the invention. As mentioned previously the effect used for obtaining measurable light (on the order of one micron in wavelength) scattered from fluid molecules (on the order of one millimicron) is the Rayleigh scattering phenomenon. Those skilled in the art recognize, of course, that Rayleigh scattering is most simply described by the equation $$I_{sc} = I_o \frac{16\pi^4 \delta^2}{\lambda^4 R^2} NV \qquad (1)$$

where $I_{sc}$ is the intensity of the light scattered from the fluid molecules, $I_o$ is the intensity of the incident light beam, $\lambda$ is the wavelength of the incident light beam, $\delta$ is the polarizability of the fluid molecules (that is, the ratio of the molecules dipole moment and the summation of the electric fields acting on the molecule), V is the volume fluid at the point of incidence, R is the distance from the scattering volume between the points 20 and 20', and N is the number of molecules in the scattering volume (the density). From only a brief examination of Equation 1 it is obvious to one skilled in the art that, for a large change in intensity of back scattered light, the light transmitter should emit a mono-chromatic, high-peak-power, short wavelength, and highly directional light beam. It is interesting to note that the above criteria are definitive characteristics of a pulsed laser beam. Ruby lasers, known in the art, emit pulses having a peak power of $10^9$ watts in a bandwidth less than 0.01 A. (around a center wavelength of 6943 A.)

In order to completely characterize incident and scattered light intensity in more meaningful terms than are obtained from Equation 1, one must know the phase of both incident and scattered light rays. This phase information may be incorporated into Equation 1 by working in terms of complex amplitude functions. The form of Equation 1 is a simplification of the actual scattering. In reality, $\delta$ the polarizability, is a tensor quantity, causing the value of Equation 1 to differ numerically depending upon the state of polarization of the outgoing light. By the use of a matrix formulation employing a set of intensity quantities called modified Stokes parameters, Equation 1 may be expanded to describe the light intensity of the scattered light caused by an incident beam polarized perpendicular to the scattering plane. The intensity of the scattered light 18 is then described by the equation $$I_{so} = I_o \frac{16\pi^4}{\lambda^4 R^2} NV(3A+2B \quad (2)$$

where A and B are complex quantities in terms of $\Upsilon$ (the scattering angle) and the coordinate components of $\delta$. Evaluating Equation 2 for any angle will show that the magnitude of scattered light polarized perpendicular to the scattering plane is independent of scattering angle. Thus, this scattering pattern due to each molecule is circularly symmetric in the scattering plane.

With reference to FIG. 2, there is shown a curve 50 describing, generally, the intensity pattern of scattered light produced by a fully polarized light beam 17 of intensity $I_o$ having its electric field vector $\overline{E}$ perpendicular to the plane of the drawing and being incident upon the point 20. With the electric field vector $\overline{E}$ of the fully polarized light beam 17 parallel to the plane of the drawing, the intensity pattern is described generally by a curve 51, shown in FIG. 2. Moreover, a general relationship of the intensity $I_{sc}$ of back-scattered light to the incident beam 17 in the plane perpendicular to the scattering plane is described by the curve 50. Thus, it may be seen that the light receiver may track the light beam without angle sensitivity as long as the electric field vector of the received scattered light is perpendicular to the plane formed by the direction of sensitivity of the receiver and the incident light beam.

An important consideration of a laser density gauge is the variation of atmospheric constituents as a function of altitude. This is important because $\delta$, the molecular polarizability, varies as a function of atmospheric constituents. Atmospheric constituents (and therefore the mean molecular weight) are constant to about 100 kilometers (330,000 feet) and, therefore, $\delta$ is strictly constant as required by the Rayleigh equation. This fact insures that laser back-scatter is indeed a truly linear function of density up to 330,000 feet.

A brief summary of light scattering having been given, attention is again directed to further structures that may be employed to mechanize the invention. While not illustrated in the embodiment of the invention shown in FIG. 1, a double concave lens or a plano-concave lens may be included in the optical system of the receiver 15 if it is desired to re-collimate the received light rays 18 after they have passed through the lens 60. Such a collimating lens would be generally located between the lens 60 and its focal point 67. Received light rays 18 that are gathered by the lens 60 and tend to be focused through the point 67, upon passing through such an appropriately-positioned collimating lens, would be rendered parallel to one another. Re-collimation of the gathered light rays 18 by the means described, or by other means, may be advantageous to affect a more even distribution of the scattered light rays 18 on the photo-cathode of the photo-detector 31.

To further eliminate background noise from the receiver system, a laser crystal can be cut at a 90° angle to the crystal axis. With reference to Equation 2, this means that the laser emits a light beam 17 that is fully polarized and satisfies exactly the requirements of Equation 2. Thus, all background noise can be reduced by a factor of two simply by placing a polarizing prism in the optical path of the back-scattered light rays 18 between the filter 30 and the photo-detector 31.

The light transmitter 13 of the preferred embodiment may comprise a laser and, more particularly, a giant-pulse laser 12. While lasers have been in existence only a few years, from their conception they have received widespread acclaim and recognition of their scientific and practical value. A ruby laser, proposed as one type of light transmitter that may be used in the present invention, was first successfully operated by Dr. T. H. Maiman of Hughes Aircraft Corporation. Dr. Maiman's article entitled "Stimulated Optical Radiation in Ruby Masers," published in August 1960, in the periodical Nature, Volume 187, pages 493 and 494, basically describes the theory and operation of his device. More recently, the theory and structure of the laser have been developed to a point where more intense and controllable pulsations are obtainable from a ruby laser. One technique of obtaining these "giant" pulses from what is commonly known as a giant-pulse laser is described, for example, in a technical paper entitled "Characteristics of Giant Optical Pulsations From Ruby" by F. J. McClung and R. W. Hellwarth, published in the January 1963 issue of the Proceedings of the Institute of Electrical and Electronics Engineers, Volume 51, at pages 46 through 51, inclusive. Since lasers, generally, and giant-pulse lasers in particular are so well known in the scientific community and well described in the literature, a detailed description of the laser used in the invention will not be presented.

As mentioned above, in the receiver system 15 there has been included an optical system that, as illustrated in FIG. 1, includes a lens 60 focused on a known part of the light beam 17 and a pair of lens stops 61 and 62, respectively, which cooperate to limit the field of view of the lens 60 between the boundaries 59. The size of the respective apertures in the stops 61 and 62 are precisely determined so that they subtend an angle defining a relatively narrow field of view, termed the telescope acceptance angle $\rho$. The optical system enables the receiver 15 to detect only light scattered by molecules of the atmosphere that have been intercepted by the light rays of the light beam 17 between the points of incidence 20 and 20', on the outer limits of the field of view of the lens 60. The field of view of the receiver 15 through the lens 60 may be restricted still further by forming the apertures in the stops 61 and 62 in the shape of narrow slots. Thus, the receiver 15 could be restricted in one plane to view only the approximate width of the laser beam 17 between the points 20 and 20'.

Having described the structures of the density measuring apparatus 11 illustrated in FIG. 1 and the scattering theory on which the system operation is founded, it is well to relate the sequence of operation of the equipment previously described. In response to an inquiry from the pilot or command electronics of the vehicle 10, the sync circuit 70 applies the command signal 71 to the giant-pulse laser 12 of the light transmitter 13. The laser 12, for the duration of the command signal 71 emits a light beam 17. Simultaneously, the receiver system 15 is actuated by the application of the control signal 72 to the photo-detector 31. Light, scattered toward the vehicle 10 by particles of the atmosphere within the field of view (designated by the boundaries 59) of the lens 60 between the points 20 and 20' is gathered by the lens 60 of the receiver 15, passed through the filter 30 and impinged on the photo-cathode surface of the photo-detector 31. The photo-detector 31, in response to the impinged scattered light rays 18, generates an electrical signal 80 corresponding to the intensity of the reflected light rays 18, the electrical signal 80 is amplified by the amplifier 32 and applied to the indicator electronics 33, which operates in response to the electrical signal 80 and the reference signal 65 to indicate (by meter readings or telemetry signal) the density of the fluid comprising the atmosphere between the points 20 and 20'.

It is to be understood that the above described arrangements are illustrative of the application of the principles of the invention. Numerous other arrangements may be devised by those skilled in the art without departing from the spirit and scope of the invention. Thus, by way of example and not of limitation, other types of coherent light transmitters may be used to generate the incident light beam 17. It is expected that, at the rate which the technology of coherent light transmitters is advancing, in the near future more controllable and higher intensity coherent light sources will be available for employment in the present invention. Still further, there are in the optical filter art a number of optical filters which may be substituted for the filter 30 described hereinabove for filtering from the scattered light signal 18 those frequencies which are unwanted.

Moreover, the receiver system may employ a number of well known photo-multiplier tubes or photo-diodes for the square-law detection of the magnitude of the scattered light and the generation of the representative signal. More particularly, by way of example, the possibility of being able to use a semiconductor photo-diode, as mentioned above, as the photo-detector 31 in the present system is a constantly increasing one. The process of photo-mixing in semiconductor junction arises from the fact that the optical-absorption pair excitation process is inherently non-linear. Generally, the number of generated pairs is directly proportional to the square of the electric field vector which characterizes the incident radiation. A detailed description of coherent light detection in solid state photo-diodes is found in the January 1963, issue of the Proceedings of the Institute of Electrical and Electronics Engineers, Volume 51 at pages 166 through 172. Accordingly, a more detailed explanation is deemed to be unnecessary; but those skilled in the art may easily see that such a photo-detection means may be employed in many of the density measuring systems of the present invention.

The amplifier 32 and indicator electronics 33 described above may be replaced by many of the amplifiers and display systems known to those skilled in the art without departing from the spirit or scope of the invention. What is required is that the signal generated by the photo-detector corresponding to the magnitude of scattered light be divided by the local oscillator reference signal and the quotient of such a division process be converted in some efficient manner to term of density.

Referring to the construction of the port windows 24 and 27, it will be recognized that numerous materials currently being developed in the art and techniques for using these materials may be employed in the mechanization of the present invention to provide strong transparent windows in the side of a vehicle through which the light rays may be passed readily. It has been contemplated by the inventors that such port windows may be constructed to form the lens 60 and the beam-splitter 21. Moreover, all of the optical components, the beam-splitter 21, the lens 60, a collimating lens, and the optical stops may, as mentioned above, be constructed to fit the particular application of the invention. Accordingly, from the foregoing it is evident that various changes may be made in the structure used to mechanize the present invention without departing from the spirit and scope of the invention. It is intended, therefore, that the invention be limited only by the scope of the appended claim.

What is claimed as new is:

1. Apparatus for determining the physical density of a medium, said apparatus comprising:
a laser for generating and projecting a high intensity light beam to a location a preselected distance from the apparatus wherein molecules of said medium at said location cause scattering of said light beam substantially in accordance with the equation $$I_{sc} = I_o \frac{16\pi^4 \delta^4}{\lambda^4 R^2} NV$$

where $\lambda$ is the wavelength of said light beam, R is the distance from said location, V is the volume of fluid at said location, $\delta$ is the polarizability of said molecules, $I_{sc}$ is the intensity of light scattered by said molecules in the scattering volume;

first photosensitive means for detecting light scattered by molecules of said medium;

reflection means positioned in the path of said high intensity light beam for reflecting a portion of said high intensity light beam before the light beam reaches said medium;

second photosensitive means for detecting said portion of said high intensity light beam reflected by said reflection means;

first means cooperating with said first photosensitive means for generating a first electrical signal indicative of the intensity of said light scattered by molecules of said medium;

second means cooperating with said second photosensitive means for generating a second electrical signal indicative of the intensity of said high intensity light beam; and third means responsive to respective first and second electrical signals for deriving physical density information therefrom and for producing an indication of the physical density of said medium.

References Cited

UNITED STATES PATENTS

| | | |
|---|---|---|
| 1,810,739 | 6/1931 | Vedder. |
| 2,403,631 | 7/1946 | Brown. |
| 2,684,008 | 7/1954 | Vonnegut |
| 2,877,453 | 3/1959 | Mendenhall. |
| 3,094,625 | 6/1963 | Hendrick. |
| 3,146,293 | 8/1964 | Lesage _____ 250—218 X |
| 3,150,264 | 9/1964 | Ehlert _____ 250—218 X |
| 3,231,748 | 1/1966 | Haessler et al. |
| 2,873,644 | 2/1959 | Kremen et al. |
| 2,990,339 | 6/1961 | Frank et al. |
| 3,312,826 | 4/1967 | Finkle. |

OTHER REFERENCES

Garbuny, Optical Physics, Academic Press, New York, 1965, pp. 198–199.

Porto et al., "Ruby Optical Maser as a Raman Source," J.O.S.A., v. 52, No. 3, March 1962, pp. 251–252.

J.O.S.A., "Technical Notes," Fiocco, v 54, January 1964, p. 135.

George, T. V., "Scattering of Ruby-Laser Beam by Gases," Physical Review Letters, v. 11, No. 9, Nov. 1, 1963, pp. 403–407.

RONALD L. WIBERT, Primary Examiner

W. A. SKLAR, Assistant Examiner

U.S' Cl. X.R.

250—218